United States Patent [19]

Baba et al.

[11] Patent Number: 4,620,961

[45] Date of Patent: Nov. 4, 1986

[54] ALUMINUM ALLOY HAVING A HIGH ELECTRICAL RESISTANCE AND AN EXCELLENT FORMABILITY

[75] Inventors: Yoshio Baba; Teruo Uno; Hideo Yoshida; Yoshifusa Shoji, all of Nagoya, Japan

[73] Assignee: Sumitomo Light Metal Industries, Ltd., Tokyo, Japan

[21] Appl. No.: 621,592

[22] Filed: Jun. 18, 1984

[30] Foreign Application Priority Data

Sep. 16, 1983 [JP]  Japan .................................. 58-169217

[51] Int. Cl.$^4$ ............................................ C22C 21/06
[52] U.S. Cl. .................................... 420/542; 420/543; 420/545
[58] Field of Search ....................... 420/542, 543, 545; 148/415, 440

[56] References Cited

U.S. PATENT DOCUMENTS 4,094,705  6/1978  Sperry et al. ...................... 420/545

*Primary Examiner*—R. Dean
*Attorney, Agent, or Firm*—Flynn, Thiel, Boutell & Tanis

[57] ABSTRACT

A high electrical resistance, superior formability aluminum alloy useful as structural materials used in structures suffering the action of high magnetic field, nuclear fusion reactor or the like, said aluminum alloy consisting essentially of, by weight, 1.0 to 8.0% of Mg, 0.05 to less than 1.0% of Li, at least one element selected from the group consisting of 0.05 to 0.20% of Ti, 0.05 to 0.40% of Cr, 0.05 to 0.30% of Zr, 0.05 to 0.35% of V, 0.05 to 0.30% of W and 0.05 to 2.0% of Mn, and the balance being aluminum and incidental impurities. Further, Bi in the range of 0.05 to 0.50 wt. % may be contained in said alloy.

7 Claims, No Drawings

ALUMINUM ALLOY HAVING A HIGH ELECTRICAL RESISTANCE AND AN EXCELLENT FORMABILITY

BACKGROUND OF THE INVENTION

The present invention relates to an aluminum alloy not only having a higher electrical resistance but also excellent formability, for example, press formability, bending formability, in comparison with heretofore available aluminum alloys.

Aluminum alloys have been heretofore used as a good conductor because of their low electrical resistance as compared to iron and iron alloys. However, in recent years, aluminum alloys have been extensively used in other applications.

In the case of use under high magnetic field, aluminum alloys having an increased electrical resistance are requested. The use of aluminum alloys under such condition causes induced current corresponding to variation of the magnetic field and the aluminum alloys will be affected by the external force resulting from the actions of the magnetic field and the electrical field. Since the external force is proportional to the induced current density, it is necessary to minimize the current density. For this reason, it has been very important to increase the electrical resistance.

Conventional Al-Mg type practical aluminum alloys have a specific resistance under 6.4 $\mu\Omega$.cm (IACS of over 27%).

Previous investigations which are described in a pending application proved that an addition of lithium is very effective in increasing electrical resistance. But, addition of lithium in a large amount results in a decrease in ductility and, accordingly, will reduce elongation below 10%. Therefore, there is a keen demand for the development of high electrical resistance aluminum alloys having highly improved ductility and formability.

SUMMARY OF THE INVENTION

It is therefore an object of the present invention to provide improved alloys having both high electrical resistance and good formability, and particularly aluminum alloys excellent in formability which are highly suitable as structural materials used in structures placed under the action of high magnetic field.

In accordance with the present invention, there are provided aluminum alloys having a high electrical resistance and an excellent formability, said alloy consisting essentially of, in weight percentages:

(1)
Mg: from 1.0 to 8.0%, preferably from 2.0 to 7.0%,
Li: from 0.05 to less than 1.0%,
at least one element selected from the group consisting of, in weight percentages:
Ti: from 0.05 to 0.20%,
Cr: from 0.05 to 0.40%,
Zr: from 0.05 to 0.30%,
V: from 0.05 to 0.35%,
W: from 0.05 to 0.30%,
Mn: from 0.05 to 2.0%,
and the balance being aluminum and incidental impurities; or
(2)
Mg: from 1.0 to 8.0%, preferably from 2.0 to 7.0%,
Li: from 0.05 to less than 1.0%,
Bi: from 0.05 to 0.50%,
and at least one selected from the group consisting of, in weight percentages:
Ti: from 0.05 to 0.20%,
Cr: from 0.05 to 0.40%,
Zr: from 0.05 to 0.30%,
V: from 0.05 to 0.35%,
W: from 0.05 to 0.30% and
Mn: from 0.05 to 2.0%,
and the balance being aluminum and incidental impurities.

The aluminum alloys of the present invention made it possible to increase their electrical resistance to a level higher than the specific resistance of 6.4 $\mu\Omega$.cm exhibited by the heretofore used aluminum alloys, by using the composition set forth above.

DETAILED DESCRIPTION OF THE PREFERRED EMBODIMENTS

As mentioned earlier briefly, the present invention provides aluminum alloys having a high electrical resistance and an improved formability, which consist essentially of, by weight percentages set forth below:

(1)
Mg: from 1.0 to 8.0%, preferably from 2.0 to 7.0%,
Li: from 0.05 to less than 1.0%,
at least one element selected from the group consisting of, in weight percentages:
Ti: from 0.05 to 0.20%,
Cr: from 0.05 to 0.40%,
Zr: from 0.05 to 0.30%,
V: from 0.05 to 0.35%,
W: from 0.05 to 0.30%,
Mn: from 0.05 to 2.0%,
and the balance being aluminum and incidental impurities; or
(2)
Mg: from 1.0 to 8.0%, preferably from 2.0 to 7.0%,
Li: from 0.05 to less than 1.0%,
Bi: from 0.05 to 0.50%,
and at least one selected from the group consisting of, in weight percentages:
Ti: from 0.05 to 0.20%,
Cr: from 0.05 to 0.40%,
Zr: from 0.05 to 0.30%,
V: from 0.05 to 0.35%,
W: from 0.05 to 0.30%,
Mn: from 0.05 to 2.0%,
and the balance being aluminum and incidental impurities.

In the aluminum alloy of the present invention, Mg is an indispensable ingredient to ensure strength of Al-Li type alloys at a required level and, for this purpose, Mg is required to be added in an amount of 1.0 to 8.0 wt. %, preferably 2.0 to 7.0 wt. %. Addition of more than 8.0 wt. % causes cracks during preparation of ingot or rolling operation and presents difficulties in the preparation of the desired alloys.

Lithium is an essential element to increase the electrical resistance. If lithium is added in an amount of 1.0 wt. % or more, elongation will fall below 10% and thereby formability considerably reduces below an acceptable level, although the excessive addition of lithium is effective to improve strength.

On the contrary, Li in an amount less than 1.0 wt. % ensures an elongation of not less than 10% and, particularly, when the alloy is subjected to annealing treatment, a further high elongation level of approximately 20% is readily obtainable. By virtue of the good elongation, bending forming and press forming can be successfully conducted. But, the addition of lithium below 0.05% can not fulfill the higher electrical resistance value than alloys heretofore available.

Ti, Cr, Zr, V and W serve to increase electrical resistance and further have effects on refining grain size and increasing strength.

When these elements are added in amounts beyond the respective upper limits set forth above, these elements will form intermetallic compounds with Al and cause crystallization of the resulting intermetallic compounds during soldification. Since the intermetallic compounds detrimentally affect toughness and elongation, the excessive addition of these elements above the upper limits should be avoided. These five elements effectively function either singly or in combination of two or more thereof.

Further, Mn is also effective to increase the electrical resistance, refine the grain size and enhance the strength as well as Ti, Cr, Zr, V and W above mentioned. Since addition exceeding 2.0% has an adverse effect on toughness, the upper limit of 2.0% for Mn should be followed.

Further, when special considerations are required for residual radioactivity, as in the case of materials used in nuclear reactors, Mn may adversely act. For example, in case Mn present in the aluminum alloys in an amount of 1%, residual radioactivity after D-T discharge lowers to only $10^{-1}$ mrem/hr after lapse of one year and, even after lapse of five years from the D-T discharge, the residual radioactivity is reduced to one-tenth. Thus, in the cases of the above applications, addition of Mn should be avoided.

Bi is added to prevent cracks of ingot which are liable to arise from Mg content over 6.5%.

The aluminum alloys of the present invention having the composition set forth above have a high-value electrical resistance of not less than 6.4 $\mu\Omega$.cm (IACS: less than 27%), an increased strength of $\sigma\beta$: not less than 15 kg/mm$^2$ and, further $\sigma\beta$: not less than 20 kg/mm$^2$, in tensile strength, and, further, an improved elongation of not less than 10%, and, further, not less than 20%. The desired combination of the properties renders the alloys of the present invention useful in applications such as structural materials of liner motorcars used in a strong magnetic field, of nuclear reactors and so forth. Particularly, among the aluminum alloys of the present invention, Mn free aluminum alloys are preferred for use as structural materials of nuclear reactors, since the Mn free alloys are effective in reducing residual radioactivities while having the increased electrical resistance.

In order to further understand the present invention and the advantages derived therefrom, the following illustrative examples are presented.

EXAMPLE

Al-Mg-Li type aluminum alloys having the various alloy compositions given in Table I below were melted using a high frequency furnace in an atmosphere of argon gas and cast into an ingot having a thickness of 30 mm and a cross section of 175 mm $\times$ 175 mm to be rolled. Thereafter, the resulting ingots were homogenized at a temperature of from 450° to 500° C. in an atmosphere-adjusted furnace, hot rolled to 4 mm in thickness at a temperature of 350° to 450° C. and cold rolled to 2 mm thick. The thus cold rolled sheet was subjected to softening treatment at a temperature of from 300° to 400° C. to provide test specimens. The thus obtained specimens with various alloy compositions were examined on electrical resistance (specific resistance) and tensile strength properties and the test results are shown in Table II. The electrical resistance was measured by the eddy current method in accordance with ASTM-B-342. Measured values are given in IACS, and, further, for reference, the measured resistance values were converted to $\mu\Omega$.cm. For example, 27% in IACS is equivalent to the resistance value of 6.4 $\mu\Omega$.cm.

When Mg which is an alloying element is present in the alloys in an amount beyond the upper limit set forth above, cracks occurred during hot rolling operation and the above mentioned specimen could not be obtained. Further, since Ti, Mn, Cr, Zr, V and W in the amounts exceeding the respective ranges specified above lead to crystallization of secondary dispersion phase, namely, Al-Ti, Al-Mn, Al-Cr, Al-Zr, Al-V, and Al-W type giant crystals, the alloys containing such excessive amounts of these elements were not prepared.

The bending work test were conducted by examining the limit of bending radius, that is, by examining how many times thickness of sheet the test specimens can be bent. Further, evaluation of residual radioactivity was made by measuring the radioactivity level of each specimen after lapse one month from D-T reaction. In Table II, the mark "O" indicates the level ($10^{-2}$ mrem/hr) which is almost harmless to human being, the mark "Δ" indicates the level ($10^{-1} - 10^{-2}$ mrem/hr) requiring some caution, and the mark "X" indicates the level ($>10^{-1}$ mrem/hr) at which human being is almost impossible to approach.

TABLE I

| Alloy No. | Alloy Composition (wt. %) | | | | | | | | | |
|---|---|---|---|---|---|---|---|---|---|---|
| | Mg | Li | Mn | Ti | Cr | Zr | V | Bi | W | Al |
| Alloys of the present Invention | | | | | | | | | | |
| 1 | 4.6 | 0.6 | 0.30 | 0.06 | 0.10 | 0.12 | 0.10 | — | — | Bal |
| 2 | 4.5 | 0.5 | — | 0.06 | 0.10 | 0.11 | 0.10 | — | — | " |
| 3 | 4.7 | 0.8 | — | 0.06 | 0.11 | 0.11 | — | 0.10 | — | " |
| 4 | 4.7 | 0.6 | — | 0.06 | 0.11 | 0.12 | — | — | — | " |
| 5 | 4.6 | 0.6 | 0.32 | 0.07 | 0.10 | 0.12 | — | — | — | " |
| 6 | 4.6 | 0.6 | 0.32 | 0.06 | — | 0.15 | — | — | — | " |
| 7 | 4.8 | 0.8 | 0.31 | 0.16 | — | — | — | — | 0.07 | " |
| 8 | 4.8 | 0.8 | 0.30 | — | 0.15 | — | — | — | — | " |
| 9 | 4.7 | 0.6 | — | — | 0.14 | 0.12 | — | — | — | " |
| 10 | 4.6 | 0.8 | 0.31 | — | — | — | — | — | — | " |
| 11 | 4.6 | 0.5 | — | — | 0.20 | — | — | — | — | " |
| 12 | 4.6 | 0.6 | — | — | — | 0.18 | — | — | — | " |
| 13 | 3.1 | 0.8 | — | 0.06 | 0.10 | 0.12 | — | — | — | " |
| 14 | 2.1 | 0.5 | 1.1 | 0.05 | 0.11 | 0.12 | — | — | — | " |

TABLE I-continued

| Alloy No. | Mg | Li | Mn | Ti | Cr | Zr | V | Bi | W | Al |
|---|---|---|---|---|---|---|---|---|---|---|
| 15 | 5.3 | 0.6 | — | 0.05 | 0.12 | 0.11 | — | — | — | " |
| 16 | 6.5 | 0.8 | — | 0.05 | 0.10 | 0.11 | — | 0.10 | — | " |
| 17 | 4.8 | 0.8 | — | 0.05 | 0.10 | 0.12 | — | — | 0.10 | " |
| Alloys for Comparison | | | | | | | | | | |
| 18 | 5.1 | 0.8 | — | 0.05 | 0.10 | 0.11 | — | — | — | — |
| 19 | 8.5 | 0.6 | — | 0.05 | 0.10 | 0.12 | — | 0.15 | — | " |
| 20 | 5.8 | 0.04 | — | 0.05 | 0.10 | 0.12 | — | — | — | " |
| 21 | 4.7 | 1.4 | — | 0.06 | 0.11 | 0.15 | — | — | — | " |
| 22 | 4.7 | — | — | 0.06 | 0.10 | 0.15 | — | — | — | " |

TABLE II

| Alloy No. | Occurence of Cracks during Rolling | Electrical IACS (%) | Resistance $\mu\Omega \cdot cm$ | Tensile Strength kg/mm$^2$ | Elongation % | Limit of Bending Radius t = Thickness of Sheet | Residual Radio-Activity |
|---|---|---|---|---|---|---|---|
| Alloys of the present Invention | | | | | | | |
| 1 | None | 21.6 | 7.98 | 34.6 | 21 | 1.2 t | Δ |
| 2 | " | 22.5 | 7.66 | 33.4 | 22 | 1.2 t | ○ |
| 3 | " | 23.8 | 7.24 | 32.5 | 25 | 1.1 t | ○ |
| 4 | " | 22.4 | 7.70 | 33.1 | 22 | 1.2 t | ○ |
| 5 | " | 21.5 | 8.02 | 34.5 | 21 | 1.2 t | Δ |
| 6 | " | 21.8 | 7.91 | 34.1 | 22 | 1.2 t | Δ |
| 7 | " | 21.7 | 7.94 | 34.2 | 21 | 1.2 t | Δ |
| 8 | " | 21.8 | 7.91 | 34.0 | 21 | 1.2 t | Δ |
| 9 | " | 21.8 | 7.91 | 33.2 | 22 | 1.2 t | ○ |
| 10 | " | 22.0 | 7.84 | 34.0 | 21 | 1.2 t | Δ |
| 11 | " | 22.1 | 7.80 | 33.0 | 24 | 1.1 t | ○ |
| 12 | " | 22.1 | 7.80 | 33.1 | 24 | 1.1 t | ○ |
| 13 | " | 23.0 | 7.50 | 23.7 | 30 | 1.0 t | ○ |
| 14 | " | 25.2 | 6.84 | 21.5 | 32 | 1.0 t | X |
| 15 | " | 21.3 | 8.09 | 34.4 | 21 | 1.2 t | ○ |
| 16 | " | 20.9 | 8.25 | 39.6 | 20 | 1.2 t | ○ |
| 17 | " | 21.9 | 7.90 | 33.4 | 21 | 1.2 t | ○ |
| Alloys for Comparison | | | | | | | |
| 18 | None | 21.8 | 7.91 | 33.5 | 21 | 1.2 t | ○ |
| 19 | Hot Tear Crack | — | — | — | — | — | — |
| 20 | None | 28.0 | 6.14 | 30.5 | 26 | 1.0 t | ○ |
| 21 | " | 18.0 | 9.58 | 37.8 | 14 | 2.5 t | ○ |
| 22 | " | 30.2 | 5.71 | 27.7 | 28 | 1.0 t | ○ |

As explained above, the alloys according to the present invention have not only a higher electrical resistance but also an excellent formability.

What is claimed is:

1. A manganese-free, aluminum alloy having a high electrical resistance and an excellent formability and suitable for use in nuclear reactors, said aluminum alloy consisting essentially of, in weight percentages:
   Mg: from 1.0 to 8.0%,
   Li: from 0.05 to less than 1.0%,
   Bi: from 0.05 to 0.50%
at least one element selected from the group consisting of, in weight percentages:
   Ti: from 0.05 to 0.02%
   Cr: from 0.05 to 0.40%
   Zr: from 0.05% to 0.30%
   V: from 0.05 to 0.35%
   W: from 0.05 to 0.30%, and
the balance being aluminum and incidental impurities.

2. An aluminum alloy as claimed in claim 1, wherein said alloy contains from 2.0 to 7.0 wt. % of Mg.

3. An aluminum alloy as claimed in claim 1, wherein said alloy contains over 6.5 wt. % of Mg.

4. An aluminum alloy as claimed in claim 1, wherein said alloy contains from 0.05 to 0.30 wt. % of Zr.

5. An aluminum alloy as claimed in claim 1, wherein said alloy contains from 0.05 to 0.40 wt. % of Cr.

6. An aluminum alloy as claimed in claim 1, wherein said alloy contains from 0.05 to 0.30 wt. % of W.

7. An aluminum alloy as claimed in claim 1, wherein said alloy contains from 0.05 to 0.40 wt. % of Cr and from 0.05 to 0.30 wt. % of Zr.

* * * * *